United States Patent
Sadek et al.

(10) Patent No.: US 9,226,173 B2
(45) Date of Patent: Dec. 29, 2015

(54) MULTI-RADIO COEXISTENCE

(71) Applicant: QUALCOMM Incorporated, San Diego, CA (US)

(72) Inventors: Ahmed Kamel Sadek, San Diego, CA (US); Tamer Adel Kadous, San Diego, CA (US); Pranav Dayal, San Diego, CA (US); Ashok Mantravadi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 221 days.

(21) Appl. No.: 13/865,944

(22) Filed: Apr. 18, 2013

(65) Prior Publication Data

US 2013/0279355 A1 Oct. 24, 2013

Related U.S. Application Data

(60) Provisional application No. 61/635,254, filed on Apr. 18, 2012.

(51) Int. Cl.
  *H04W 36/20* (2009.01)
  *H04W 24/02* (2009.01)
  *H04L 1/00* (2006.01)
  *H04W 72/08* (2009.01)
  (Continued)

(52) U.S. Cl.
  CPC ............ *H04W 24/02* (2013.01); *H04L 1/0026* (2013.01); *H04W 72/082* (2013.01); *H04L 1/1812* (2013.01); *H04W 72/1226* (2013.01); *H04W 88/08* (2013.01)

(58) Field of Classification Search
  CPC ............ H04W 72/082; H04W 52/243; H04W 52/244; H04W 28/04; H04W 28/048; H04W 24/02; H04W 36/20
  USPC ................ 370/252, 294, 329, 328, 230, 332; 455/501
  See application file for complete search history.

(56) References Cited

U.S. PATENT DOCUMENTS 7,466,989 B2 * 12/2008 Lee et al. ........................ 455/502
8,502,733 B1 * 8/2013 Negus et al. ................... 342/359

(Continued)

FOREIGN PATENT DOCUMENTS

WO 2011098844 A1 8/2011

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP DRAFT; 36300-B10, 3rd Generation Partnership Project (3GPP), Mobile Competence Centre; 650, Route Des Lucioles; F-06921 Sophia-Antipolis Cedex; France, Mar. 12, 2012, XP050664091, [retrieved on Mar. 12, 2012].

(Continued)

*Primary Examiner* — Wutchung Chu
(74) *Attorney, Agent, or Firm* — Seyfarth Shaw LLP

(57) ABSTRACT

A method for wireless communications includes determining a time division duplex (TDD) configuration of a non-serving network. The method also includes detecting interference from the non-serving network based at least in part on the TDD configuration of the non-serving network. The method further includes signaling an eNodeB of the interference based at least in part on the detecting.

20 Claims, 10 Drawing Sheets

(51) Int. Cl.
*H04W 72/12* (2009.01)
*H04W 88/08* (2009.01)
*H04L 1/18* (2006.01)

(56) References Cited

U.S. PATENT DOCUMENTS

| | | | |
|---|---|---|---|
| 8,630,229 B2* | 1/2014 | Himayat et al. | 370/328 |
| 8,923,225 B2* | 12/2014 | Sydor et al. | 370/329 |
| 9,026,125 B2* | 5/2015 | Dhanda | H04W 52/38 |
| | | | 455/452.2 |
| 2010/0220597 A1 | 9/2010 | Ji et al. | |
| 2012/0082038 A1* | 4/2012 | Xu et al. | 370/244 |
| 2012/0082070 A1* | 4/2012 | Hart et al. | 370/280 |
| 2012/0315935 A1* | 12/2012 | Wang et al. | 455/501 |
| 2013/0044617 A1* | 2/2013 | Boixadera et al. | 370/252 |
| 2013/0122924 A1* | 5/2013 | Yie et al. | 455/452.2 |
| 2013/0136041 A1* | 5/2013 | Hoymann et al. | 370/280 |
| 2013/0272173 A1* | 10/2013 | Niu et al. | 370/280 |
| 2013/0343241 A1* | 12/2013 | Niu et al. | 370/280 |
| 2014/0003270 A1* | 1/2014 | Maltsev et al. | 370/252 |
| 2014/0126501 A1* | 5/2014 | Pan et al. | 370/329 |
| 2014/0369221 A1* | 12/2014 | Fu et al. | 370/252 |
| 2015/0003272 A1* | 1/2015 | Hu et al. | 370/252 |

OTHER PUBLICATIONS

International Search Report and Written Opinion—PCT/US2013/037254—ISA/EPO—Jul. 11, 2013.

Qualcomm Incorporated: "ABS pattern configuration for eICIC demodulation and CSI reporting test cases", 3GPP Draft; R4-115235, 3rd Generation Partnership Project (3GPP), Mobile Competence Centre; 650, Route Des Lucioles; F-06921 Sophia-Antipolis Cedex; France, vol. RAN WG4, No. Zhuhai; 20111010, Oct. 3, 2011, XP050544296, [retrieved on Oct. 3, 2011] the whole document.

* cited by examiner

MULTI-RADIO COEXISTENCE

CROSS-REFERENCE TO RELATED APPLICATION

This application claims the benefit under 35 U.S.C. §119(e) to U.S. Provisional Patent Application No. 61/635,254 entitled "MULTI-RADIO COEXISTENCE," filed on Apr. 18, 2012, the disclosure of which is expressly incorporated by reference herein in its entirety.

BACKGROUND

1. Field

Aspects of the present disclosure relate generally to wireless communication systems, and more particularly to mitigating interference in a wireless network.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one configuration, a method of wireless communication is disclosed. The method includes determining a time division duplex (TDD) configuration of a non-serving network. The method also includes detecting interference from the non-serving network based at least in part on the TDD configuration of the non-serving network. The method further includes signaling an eNodeB of the interference based at least in part on the detecting.

Another configuration discloses an apparatus including means for determining a TDD configuration of a non-serving network. The apparatus also includes means for detecting interference from the non-serving network based at least in part on the TDD configuration of the non-serving network. The apparatus further includes means for signaling an eNodeB of the interference based at least in part on the detecting.

In another configuration, a computer program product for wireless communications in a wireless network having a non-transitory computer-readable medium is disclosed. The computer readable medium has non-transitory program code recorded thereon which, when executed by the processor(s), causes the processor(s) to perform operations of determining a TDD configuration of a non-serving network. The program code also causes the processor(s) to detect interference from the non-serving network based at least in part on the TDD configuration of the non-serving network. The program code also causes the processor(s) to signal an eNodeB of the interference based at least in part on the detecting.

Another configuration discloses a wireless communication device having a memory and at least one processor coupled to the memory. The processor(s) is configured to determine a TDD configuration of a non-serving network. The processor(s) are also configured to detect interference from the non-serving network based at least in part on the TDD configuration of the non-serving network. The processor(s) are further configured to signal an eNodeB of the interference based at least in part on the detecting.

In one configuration, a method of wireless communication is disclosed. The method includes receiving an indication that a UE served by an eNodeB is causing interference with communications of a non-serving network. The method also includes adjusting communications of the UE to reduce the interference.

Another configuration discloses an apparatus including means for receiving an indication that a UE served by an eNodeB is causing interference with communications of a non-serving network. The apparatus also includes means for adjusting communications of the UE to reduce the interference.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of receiving an indication that a UE served by an eNodeB is causing interference with communications of a non-serving network. The program code also causes the processor(s) to adjust communications of the UE to reduce the interference.

Another aspect discloses a wireless communication device having a memory and at least one processor coupled to the memory. The processor(s) is configured to receive an indication that a UE served by an eNodeB is causing interference with communications of a non-serving network. The processor(s) is also configured to adjust communications of the UE to reduce the interference.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
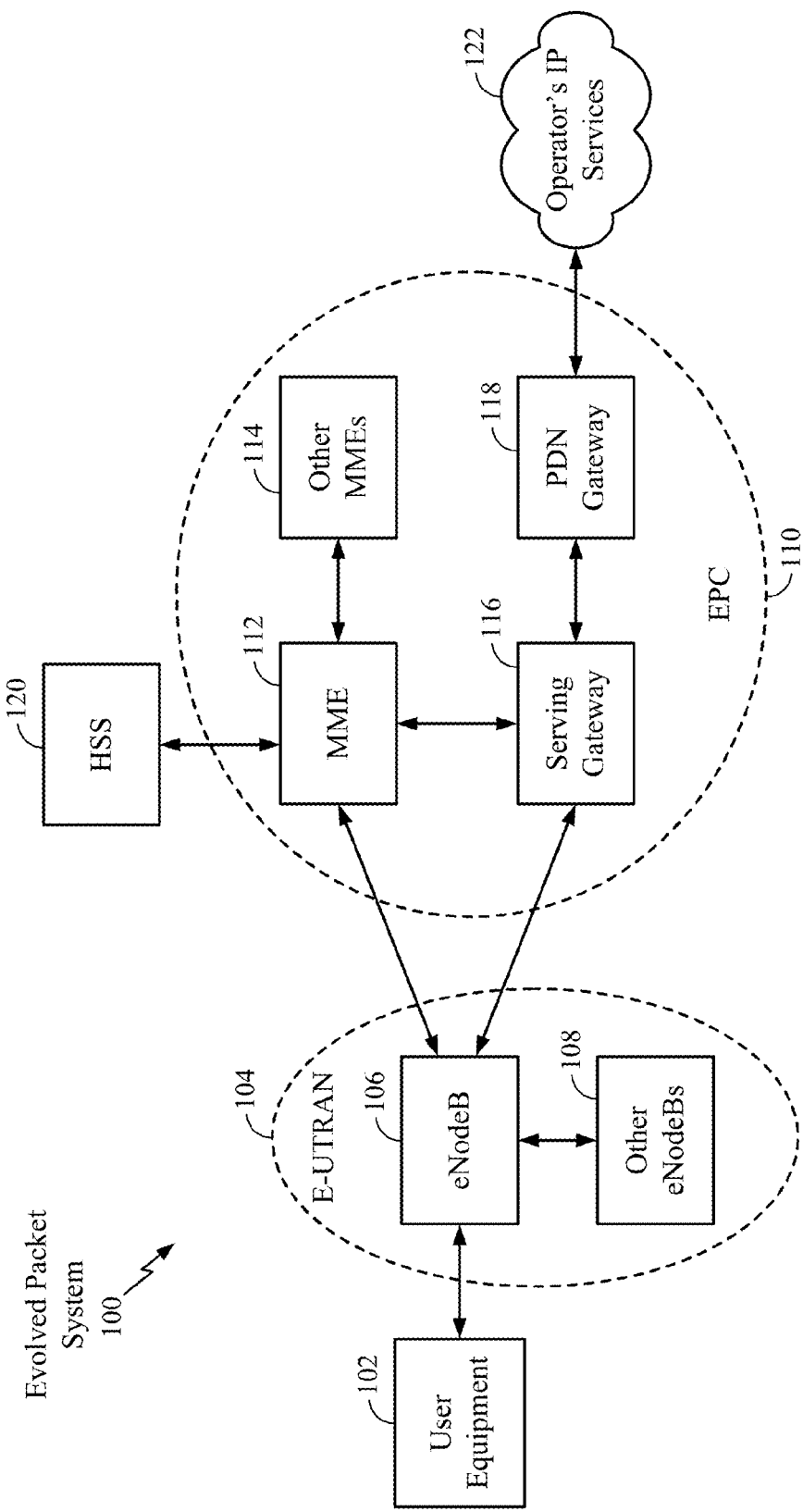
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disc and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
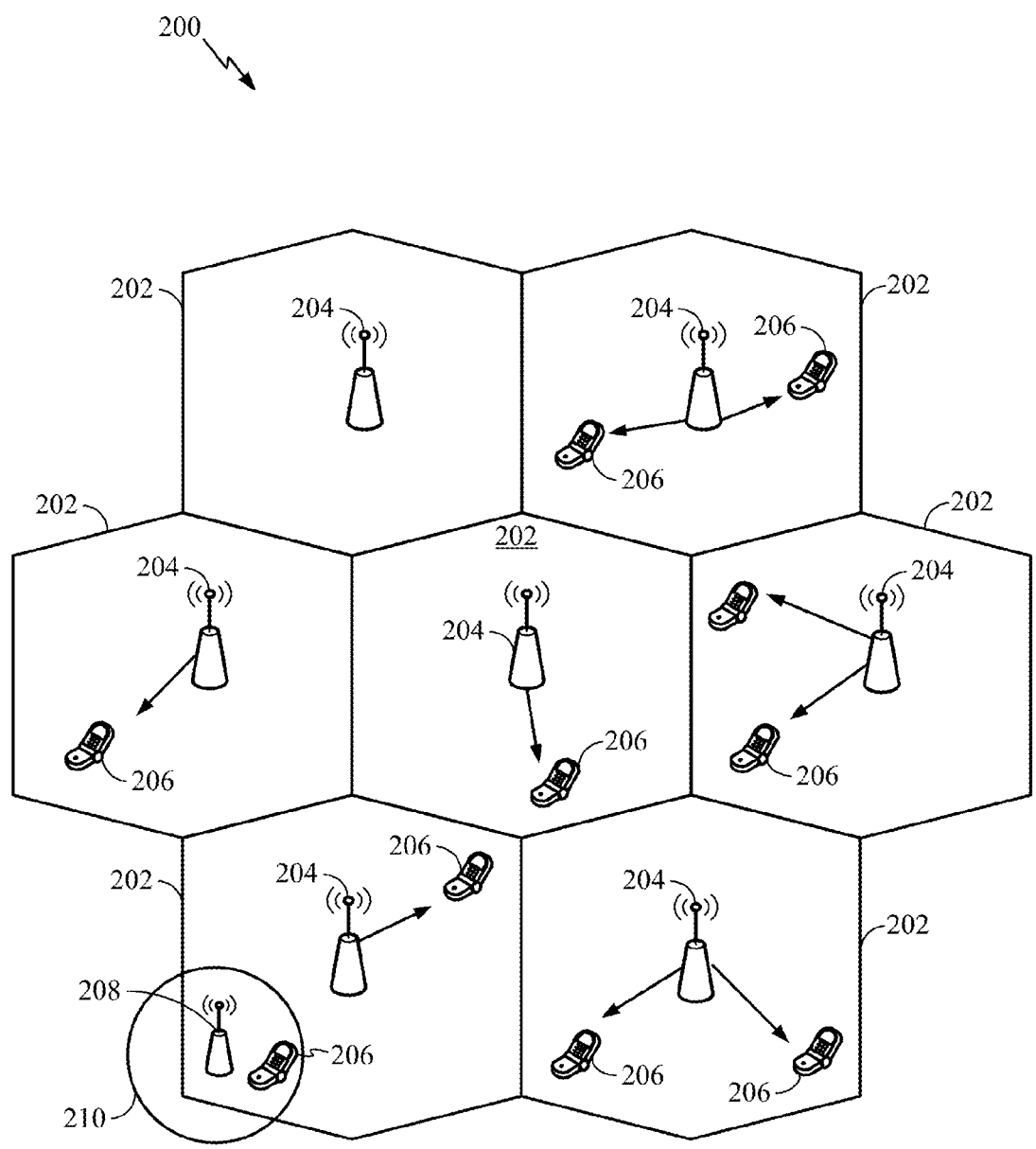
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
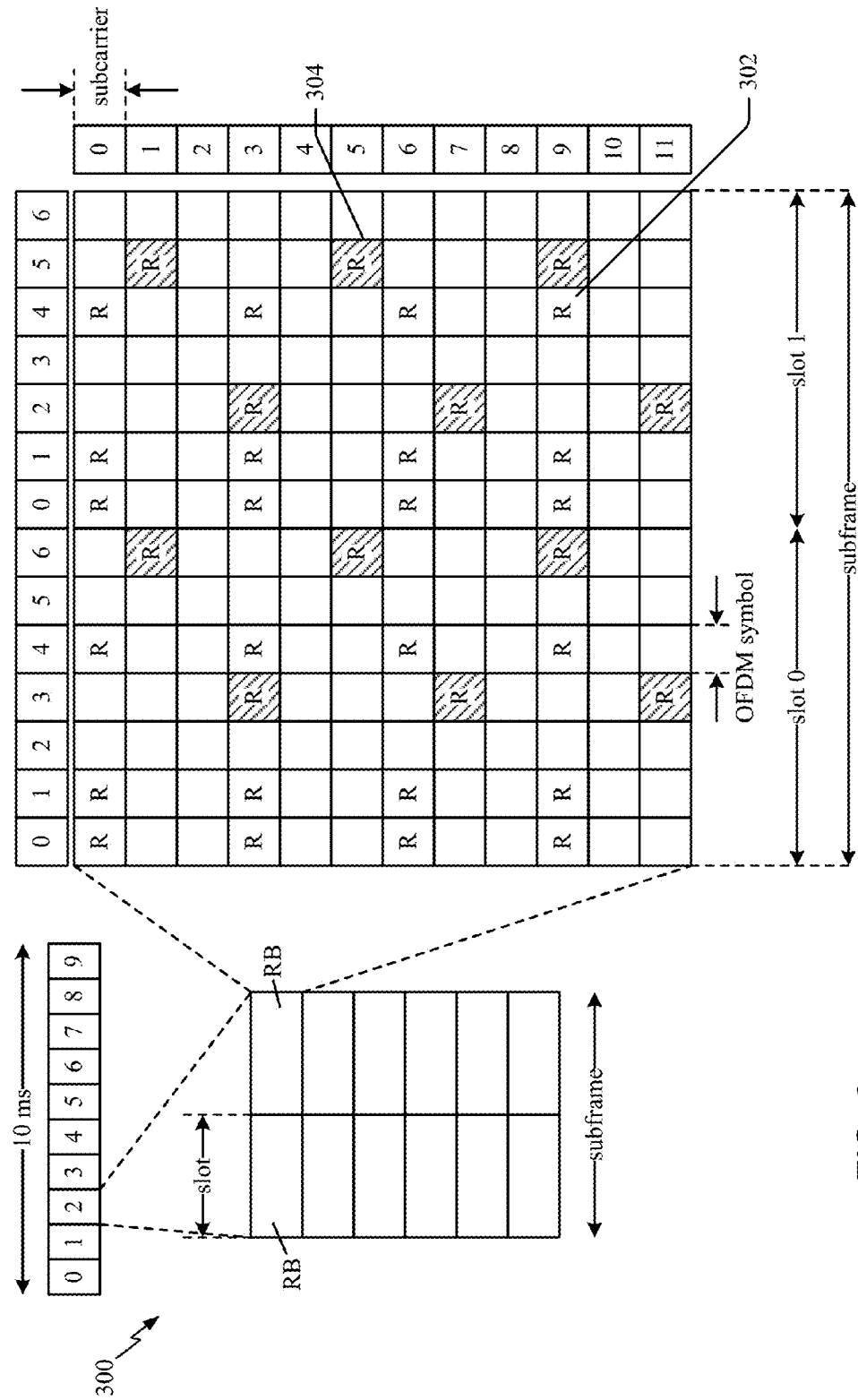
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS)

304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
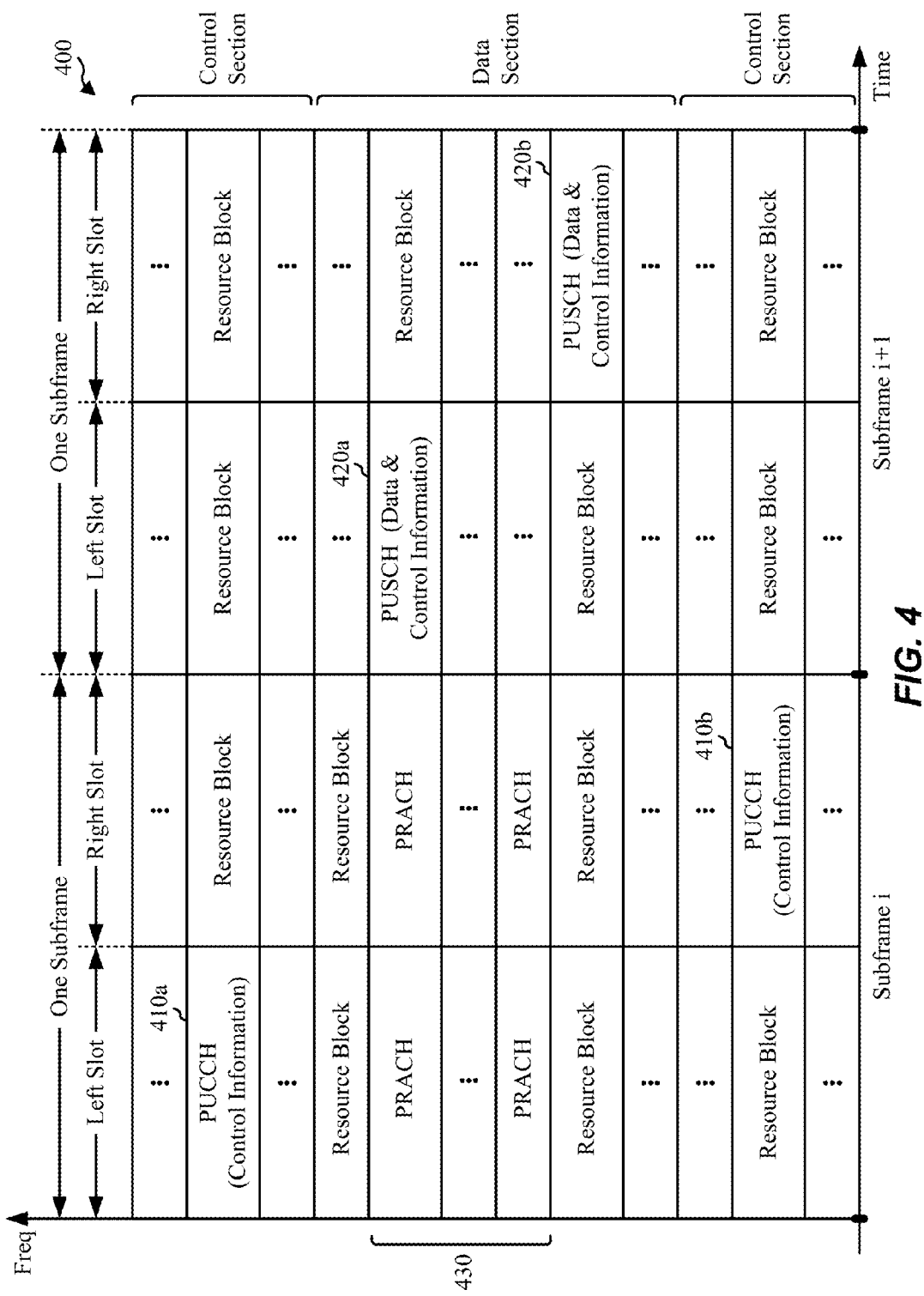
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
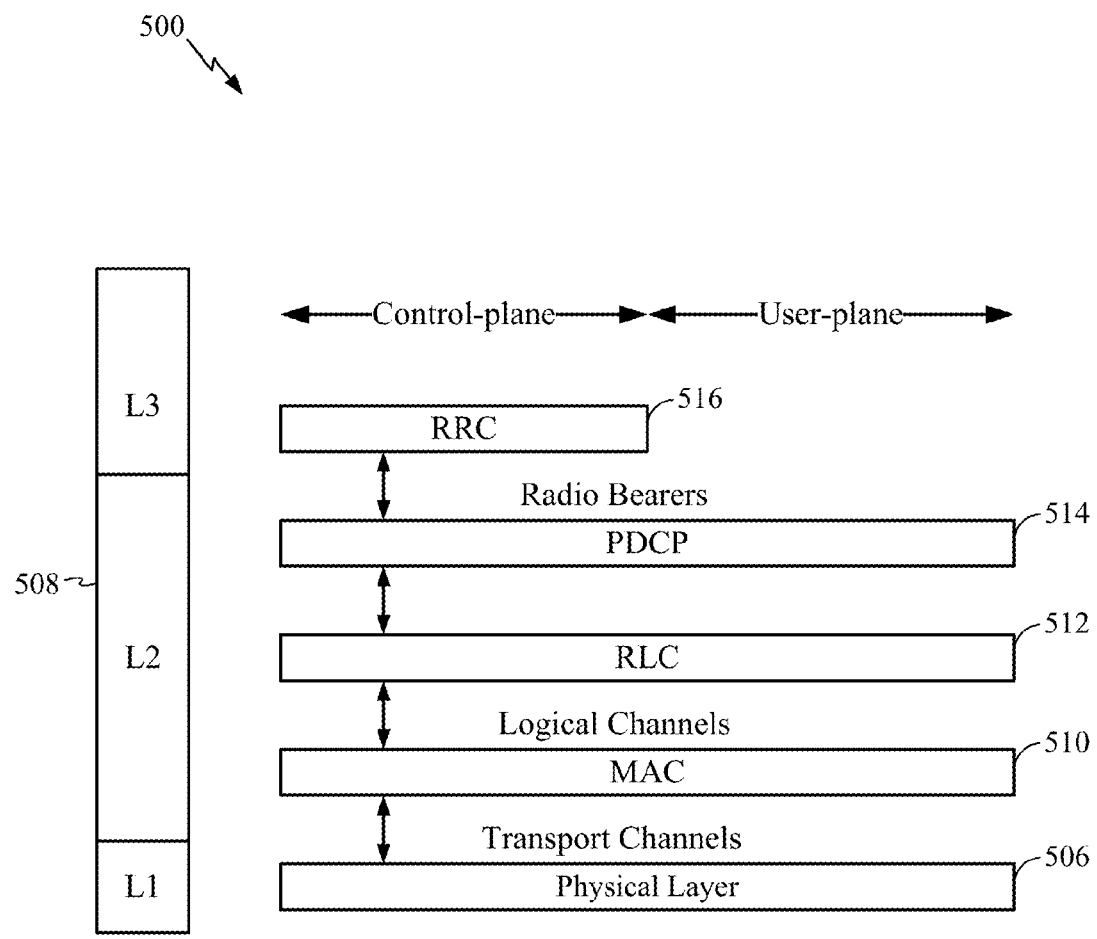
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
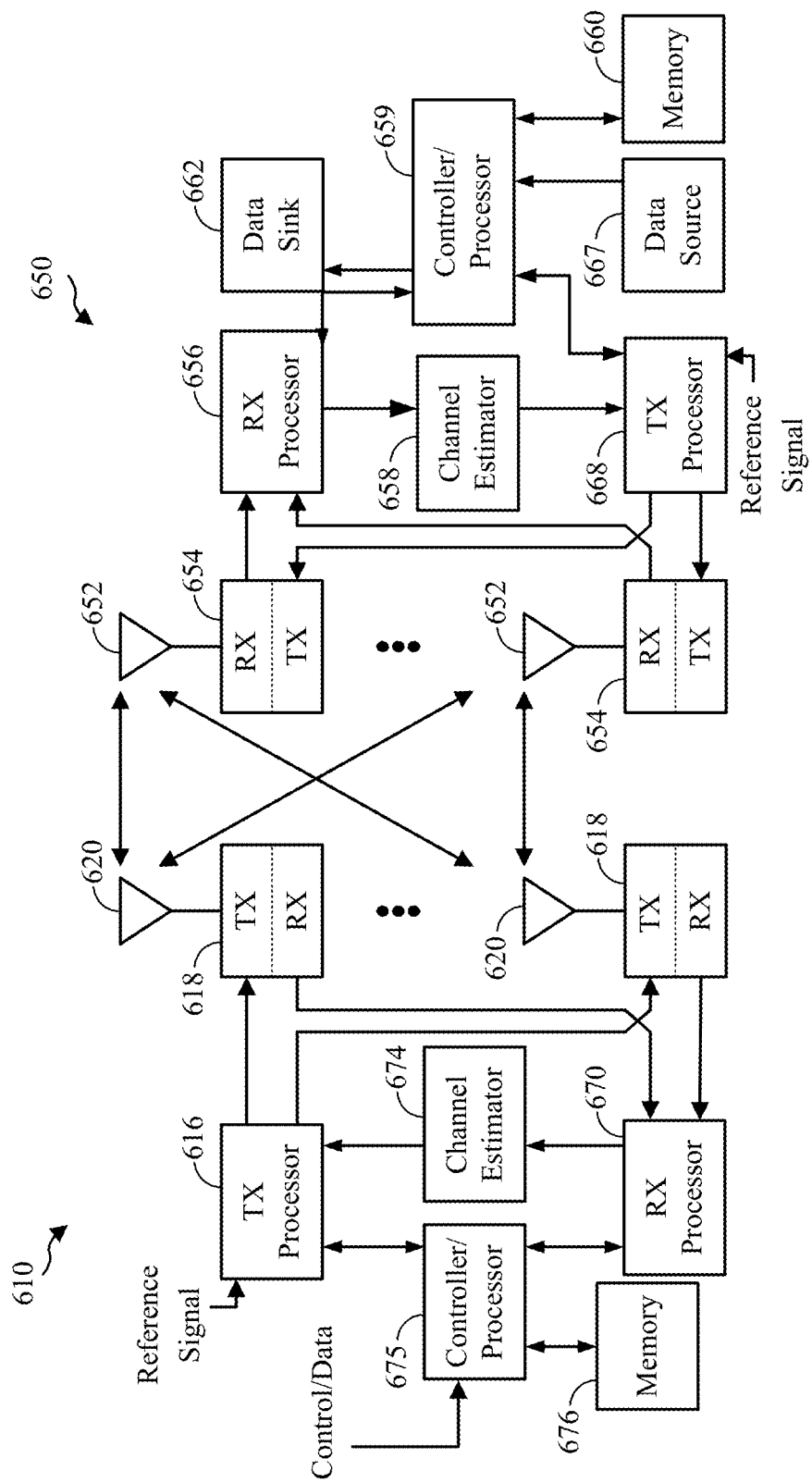
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Provided below are solutions to mitigate device to device interference for asynchronous or synchronous systems, such as a Long Term Evolution (LTE) system. According to one aspect of the present disclosure, a UE is configured to detect interference with an adjacent network and send an interference message to a serving eNodeB so that the serving eNodeB can mitigate the interference. The UE transmits the interference message when the UE encounters difficulty mitigating the interference. The UE may be a victim UE that experiences interference or may be an aggressor UE that causes interference.

According to another aspect of the present disclosure, an eNodeB, or a UE, determines a time division duplex (TDD) configuration of an adjacent network to detect and/or mitigate the interference. Furthermore, the information of the TDD configuration may be used by the eNodeB to avoid specific subframes that experience interference via scheduling, Hybrid Automatic Repeat Request (HARD) timeline changes, and advertising an adjusted TDD configuration to impacted or legacy UEs.

The TDD configuration of an adjacent network may be determined via various methods. For example, in one configuration, networks may exchange TDD configurations over a backhaul communication channel, such as an X2 interface. The eNodeB may signal the TDD configuration to the UE after the eNodeB received the TDD configuration over the backhaul communication channel.

According to another configuration, to determine the TDD configuration, a UE tunes away from the current network to read a system information block (SIB) message of an adjacent network. After determining the TDD configuration, the UE may then forward the TDD configuration to the serving eNodeB via a signaling mechanism. In yet another configuration, the UE and eNodeB exchange the TDD configuration of an adjacent network via pre-defined signaling.

As discussed above, according to one aspect of the present disclosure, the UE uses the TDD configuration of an adjacent cell to mitigate potential interference. Specifically, the UE may use the TDD configuration of an adjacent cell to perform at least two sets of measurements to assist in detecting the presence of bursty interference. In this configuration, the UE performs a first measurement on downlink subframes that do not experience interference, such as cross-device interference. These downlink subframes may be referred to as clean downlink subframes. Furthermore, the UE may perform a second measurement on downlink subframes that overlap with an uplink transmission timing of a neighboring network. These subframes may experience interference and may be referred to as potentially bad subframes or un-clean subframes. In the present configuration, the UE generates and transmits the interference message to an eNodeB based on the link quality measurements for the two sets of measurements and the frequency of the un-clean subframes.

The eNodeB may use the interference message to avoid scheduling a victim UE on un-clean subframes that overlap with uplink transmissions of an adjacent carrier. According to one aspect of the present disclosure, the eNodeB schedules the UE that generated the interference message on an edge of a channel that is furthest away from the aggressor network. That is, the eNodeB may move the victim UE away from the aggressor channel. Moving the victim UE away from the aggressor channel may impact the throughput of the victim UE. Thus, to reduce the impact on the victim UE's throughput, in one configuration, the eNodeB schedules the UE on the edge of the channel only for downlink subframes that overlap with uplink transmission timing of the adjacent network.

According to another aspect of the present disclosure, the UE or eNodeB are unaware of the TDD configuration of an adjacent carrier. In this configuration, the UE detects the presence of cross device interference by detecting bursty interference on a subset of downlink subframes. That is, in one configuration, a UE compares measurements of clean subframes of a TDD configuration with other subframes that are potentially compromised by cross device interference. The clean subframes may include subframes that are always downlink subframes in an LTE TDD configuration. For example, the clean subframes may include subframes 0 and 5. The clean subframes may also be the subframes that are always special subframes in an LTE TDD configuration. For example, the clean subframes may include subframe 2. Furthermore, the clean subframes may also be subframes that are always a special subframe or a downlink subframe. For example, the clean subframes may include subframe 6. In this configuration, the measurements may include a received signal strength indicator (RSSI), channel quality indicator (CQI), and/or signal to interference plus noise ratio (SINR) measurements.

The UE may transmit an interference message to an eNodeB after the UE detects the cross device interference. The interference message may include information such as a level and duty cycle of the bursty interference, link quality measurements with and without the interference, and a TDD configuration of the adjacent carrier. In one configuration, the interference message used for in-device interference is reused for the cross-device coexistence interference by defining specific bit fields. Furthermore, the interference message may include information to specify the type of interference (e.g., cross device interference) and the source of the interference (e.g., LTE, WiFi, Bluetooth, etc.)

According to one aspect of the present disclosure, the eNodeB mitigates potential interface on a downlink control channel, such as a physical downlink control channel (PDCCH). According to one configuration, the eNodeB schedules a narrow band control channel away from the aggressor channel. That is, the eNodeB may schedule the downlink control channel to be on an edge that is away from the aggressor channel as though a virtual guard band exists between the control channel and the aggressor channel.

The solutions of mitigating interference via an eNodeB may be incorporated on their own and may be combined in whole or in part with the solutions discussed in co-owned U.S. patent application Ser. No. 12/851,334, filed Aug. 5, 2010 in the names of DAYAL, et al., U.S. patent application Ser. No. 12/904,509, filed Oct. 14, 2010 in the names of DAYAL, et al., and U.S. patent application Ser. No. 13/004,006, filed Jan. 10, 2011 in the names of DAYAL, et al. the disclosures of which are hereby incorporated by reference in their entireties.

According to another aspect of the present disclosure, the aggressor network mitigates the potential interference. That is, an aggressor scheduler may limit a size of an uplink bandwidth allocation for uplink subframes that may collide with downlink subframes of the victim. Specifically, the interference from an aggressor network may increase as the size of an uplink bandwidth of the aggressor increases and moves closer to the bandwidth of the victim UE. Thus, the aggressor network may mitigate potential interference by limiting a size of an uplink bandwidth allocation for uplink subframes that may collide with downlink subframes of the victim.

In another configuration, UEs associated with an aggressor network are allocated a high transmit power at the farthest edge of the channel (in a frequency domain) from the victim UE. The present configuration is similar to a waterfilling solution that moves UEs on the aggressor network with a higher transmit power away from the victim channel and moves UEs with a lower transmit power towards to victim channel.

In yet another configuration, a UE determines that it is a potential aggressor by measuring the received signal power from the victim network eNodeB. If the UE is near the victim network eNodeB, the UE may assume that UEs associated with the victim network eNodeB are receiving strong signals from the victim network eNodeB, and therefore, the UE may not be an aggressor. Alternatively, the UE may signal to the serving eNodeB that it is a potential aggressor if the UE is far from the victim network eNodeB. In response, the serving eNodeB may schedule the aggressor UE on the furthest edge of the channel away from the victim network, restrict the size of the aggressor UE's bandwidth assignment, and/or cap the aggressor UE's maximum transmission power. Furthermore, if the aggressor network knows the TDD configuration of the victim network then the aggressor network may perform the above techniques only on uplink subframes that overlap with downlink subframes of the victim network.

Figure 7:
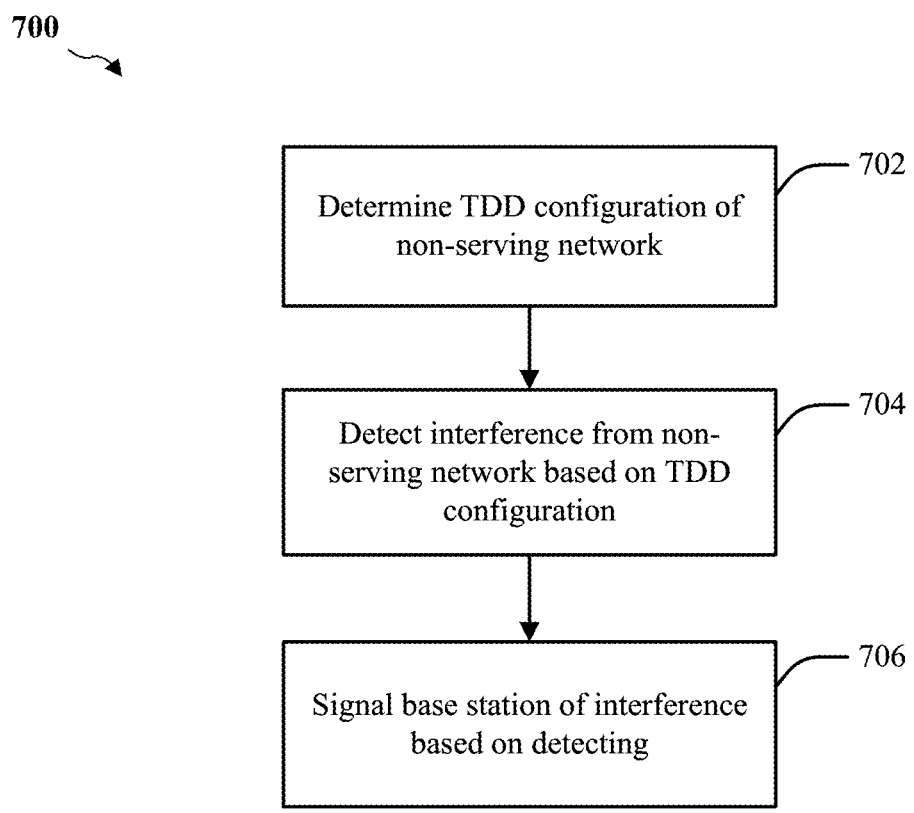
FIG. 7 is a block diagram illustrating a method for mitigating interference according to one aspect of the present disclosure.

FIG. 7 illustrates a method 700 for mitigating interference according to an aspect of the present disclosure. A UE determines a time division duplex (TDD) configuration of a non-serving network, as shown in block 702. The UE detects interference from the non-serving network based on the TDD configuration of the non-serving network, as shown in block 704. The UE signals a base station of the interference based on the detected interference, as shown in block 706.

Figure 8:
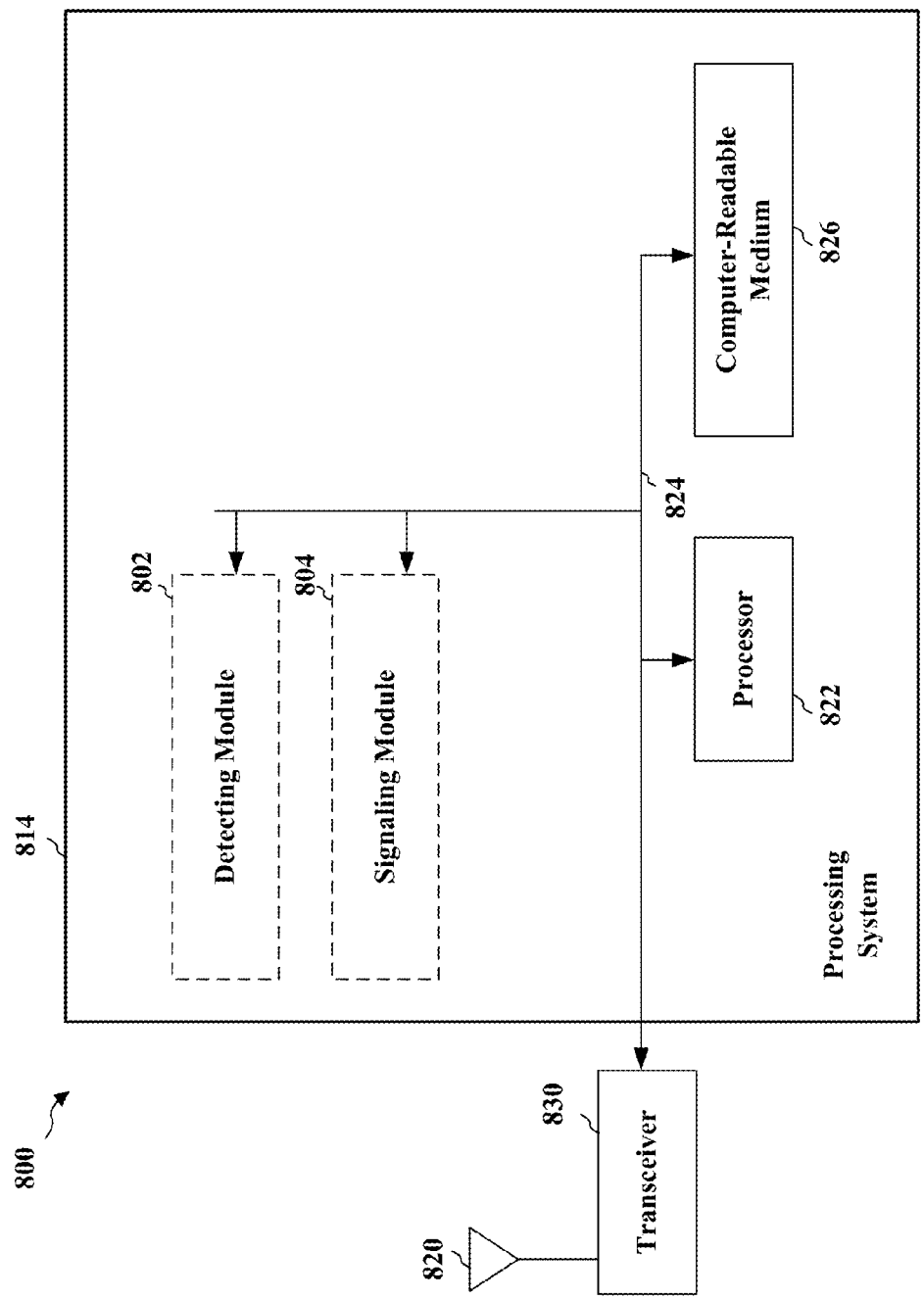
FIG. 8 is a diagram illustrating an example of a hardware implementation for an apparatus employing a method for mitigating interference.

FIG. 8 is a diagram illustrating an example of a hardware implementation for an apparatus 800 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 822 the modules 802, 804, and the computer-readable medium 826. The bus 824 may also link various other circuits such as timing sources, peripherals, voltage regulators, and power management circuits, which are well known in the art, and therefore, will not be described any further.

The apparatus includes a processing system 814 coupled to a transceiver 830. The transceiver 830 is coupled to one or more antennas 820. The transceiver 830 enables communicating with various other apparatus over a transmission medium. The processing system 814 includes a processor 822 coupled to a computer-readable medium 826. The processor 822 is responsible for general processing, including the execution of software stored on the computer-readable medium 826. The software, when executed by the processor 822, causes the processing system 814 to perform the various functions described for any particular apparatus. The computer-readable medium 826 may also be used for storing data that is manipulated by the processor 822 when executing software.

The processing system 814 includes a detecting module 802 for determining a TDD configuration of a non-serving network and for detecting interference from the non-serving network based at least in part on the TDD configuration. The processing system 814 also includes a signaling module 804 for signaling a base station of the interference based at least in part on the detecting. The modules may be software modules running in the processor 822, resident/stored in the computer-readable medium 826, one or more hardware modules coupled to the processor 822, or some combination thereof. The processing system 814 may be a component of the UE 650 and may include the memory 660, and/or the controller/processor 659.

In one configuration, the UE 650 is configured for wireless communication including means for detecting. In one configuration, the detecting means may be the controller/processor 659, memory 660, receive processor 656, modulators 654, and/or antenna 652 configured to perform the functions recited by the detecting means. The UE 650 is also configured to include a means for signaling. In one configuration, the signaling means may be the controller/processor 659, memory 660, transmit processor 668, modulators 654, and/or antenna 652 configured to perform the functions recited by the signaling means. In another configuration, the aforementioned means may be any module or any apparatus configured to perform the functions recited by the aforementioned means.

Figure 9:
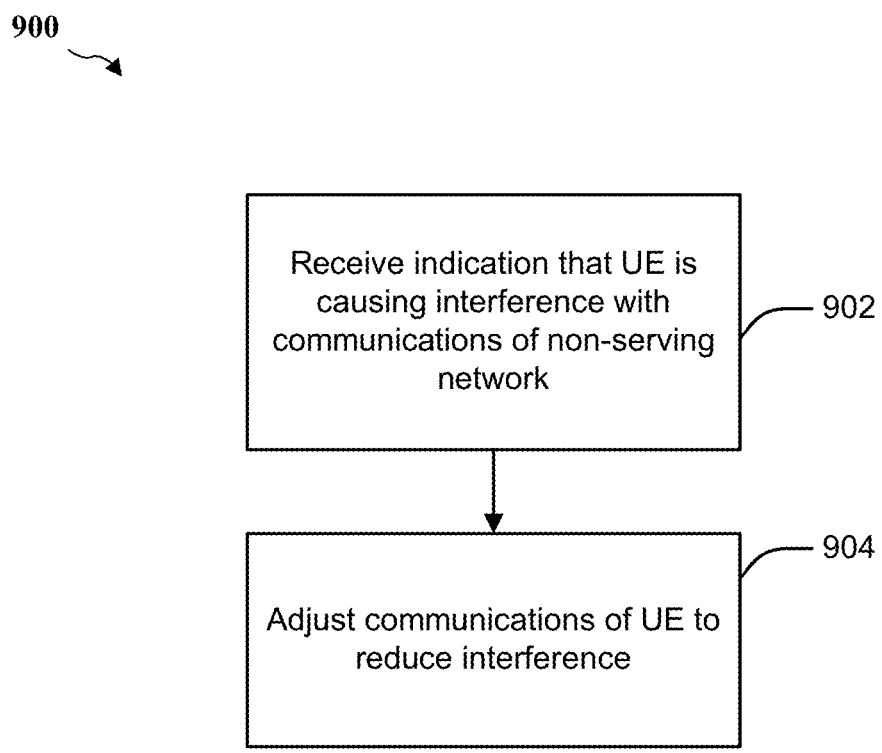
FIG. 9 is a block diagram illustrating a method for mitigating interference according to one aspect of the present disclosure.

FIG. 9 illustrates a method 900 for mitigating interference according to an aspect of the present disclosure. In block 902, an eNodeB receives an indication that a UE is causing interference with communications of a non-serving network. The eNodeB adjusts communications of the UE to reduce the interference in block 904.

Figure 10:
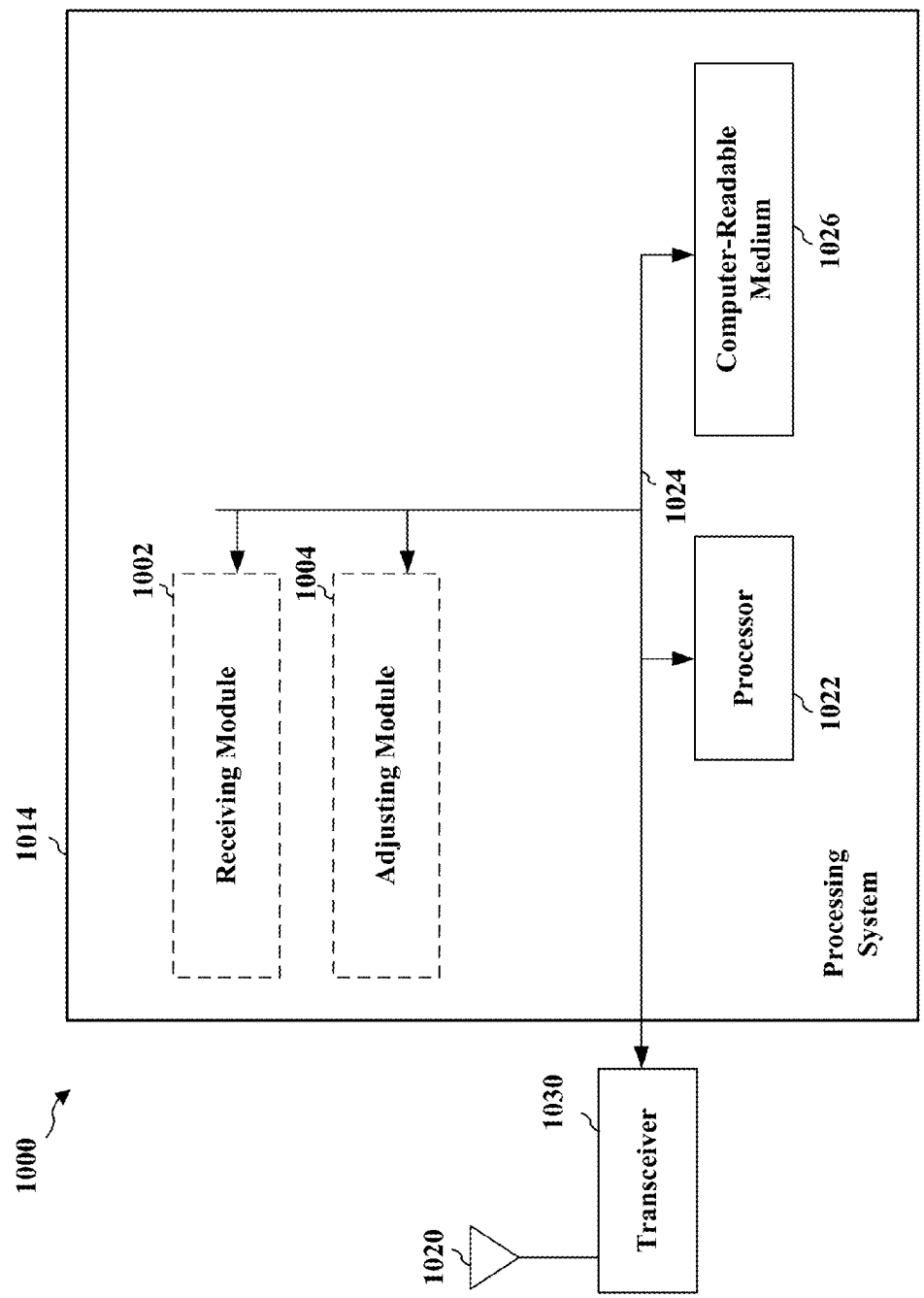
FIG. 10 is a diagram illustrating an example of a hardware implementation for an apparatus employing a method for mitigating interference.

FIG. 10 is a diagram illustrating an example of a hardware implementation for an apparatus 1000 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1022 the modules 1002, 1004, and the computer-readable medium 1026. The bus 1024 may also link various other circuits such as timing sources, peripherals, voltage regulators, and power management circuits, which are well known in the art, and therefore, will not be described any further.

The apparatus includes a processing system 1014 coupled to a transceiver 1030. The transceiver 1030 is coupled to one or more antennas 1020. The transceiver 1030 enables communicating with various other apparatus over a transmission medium. The processing system 1014 includes a processor 1022 coupled to a computer-readable medium 1026. The processor 1022 is responsible for general processing, including the execution of software stored on the computer-readable medium 1026. The software, when executed by the processor 1022, causes the processing system 1014 to perform the various functions described for any particular apparatus. The computer-readable medium 1026 may also be used for storing data that is manipulated by the processor 1022 when executing software.

The processing system 1014 includes a receiving module 1002 for receiving an indication that a UE is causing interference with communications of a non-serving network. The processing system 1014 also includes a adjusting module 1004 for adjusting communications of the UE to reduce the interference. The modules may be software modules running in the processor 1022, resident/stored in the computer-readable medium 1026, one or more hardware modules coupled to the processor 1022, or some combination thereof. The processing system 1014 may be a component of the eNodeB 610 and may include the memory 646, and/or the controller/processor 675.

In one configuration, the eNodeB 610 is configured for wireless communication including means for receiving. In one configuration, the receiving means may be the receive processor 670, demodulators 618, controller/processor 675, memory 646 and/or antenna 620 configured to perform the functions recited by the receiving means. The eNodeB 610 is also configured to include a means for adjusting. In one configuration, the adjusting means may be the controller/processor 675, memory 646, transmit processor 616, modulators 618 and/or antenna 620 configured to perform the functions recited by the adjusting means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   determining a time division duplex (TDD) configuration of a non-serving network, the TDD configuration being received at a user equipment (UE) from a serving network or read by the UE from the non-serving network during a tune-away period of the UE;
   measuring downlink quality for a first set of subframes without interference;
   measuring downlink quality for a second set of subframes with interference, the first set of subframes and the second set of subframes being determined based on the TDD configuration of the non-serving network;
   detecting interference from the non-serving network based at least in part on the downlink quality measured from the first set of subframes and the downlink quality measured from the second set of subframes; and
   signaling the detected interference to an eNodeB when the UE fails to mitigate the detected interference.

2. The method of claim 1, in which the first set of subframes comprises subframes 0, 1, 5, or 6 of a Long Term Evolution (LTE) TDD configuration.

3. The method of claim 1, in which the second set of subframes comprises downlink subframes of a serving network that overlap with uplink subframes of the non-serving network.

4. The method of claim 1, in which the eNodeB is a serving eNodeB.

5. The method of claim 1, in which the eNodeB is a non-serving eNodeB and the signaling occurs as backhaul communications.

6. An apparatus configured for wireless communication, comprising:
   means for determining a time division duplex (TDD) configuration of a non-serving network, the TDD configuration being received at a user equipment (UE) from a serving network or read by the UE from the non-serving network during a tune-away period of the UE;
   means for measuring downlink quality for a first set of subframes without interference;
   means for measuring downlink quality for a second set of subframes with interference, the first set of subframes and the second set of subframes being determined based on the TDD configuration of the non-serving network;
   means for detecting interference from the non-serving network based at least in part on the downlink quality measured from the first set of subframes and the downlink quality measured from the second set of subframes; and
   means for signaling the detected interference to an eNodeB when the UE fails to mitigate the detected interference.

7. A computer-readable medium having non-transitory program code recorded thereon, the non-transitory program code comprising:
   program code to determine a time division duplex (TDD) configuration of a non-serving network, the TDD configuration being received at a user equipment (UE) from a serving network or read by the UE from the non-serving network during a tune-away period of the UE;
   program code to measure downlink quality for a first set of subframes without interference;
   program code to measure downlink quality for a second set of subframes with interference, the first set of subframes and the second set of subframes being determined based on the TDD configuration of the non-serving network;
   program code to detect interference from the non-serving network based at least in part on the downlink quality measured from the first set of subframes and the downlink quality measured from the second set of subframes; and
   program code to signal the detected interference to an eNodeB when the UE fails to mitigate the detected interference.

8. An apparatus configured for wireless communication, the apparatus comprising:
   a memory; and
   at least one processor coupled to the memory, the at least one processor being configured:
      to determine a time division duplex (TDD) configuration of a non-serving network, the TDD configuration being received at a user equipment (UE) from a serving network or read by the UE from the non-serving network during a tune-away period of the UE;
      to measure downlink quality for a first set of subframes without interference;
      to measure downlink quality for a second set of subframes with interference, the first set of subframes and the second set of subframes being determined based on the TDD configuration of the non-serving network;
      to detect interference from the non-serving network based at least in part on the downlink quality measured from the first set of subframes and the downlink quality measured from the second set of subframes; and
      to signal the detected interference to an eNodeB when the UE fails to mitigate the detected interference.

9. The apparatus of claim 8, in which the first set of subframes comprises subframes 0, 1, 5, or 6 of a Long Term Evolution (LTE) TDD configuration.

10. The apparatus of claim 8, in which the second set of subframes comprises downlink subframes of a serving network that overlap with uplink subframes of the non-serving network.

11. The apparatus of claim 8, in which the eNodeB is a serving eNodeB.

12. The apparatus of claim 8, in which the eNodeB is a non-serving eNodeB and the signaling occurs as backhaul communications.

13. A method for wireless communications, comprising:
receiving, at an eNodeB of a serving network, an indication that a first user equipment (UE) served by the eNodeB is causing interference with communications of a non-serving network, the interference being detected by a second UE of the non-serving network based at least in part on both downlink quality measured on a first set of subframes without interference and downlink quality measured on a second set of subframes with interference, the first set of subframes and the second set of subframes being determined based on a TDD configuration of the serving network that is received at the second UE from the non-serving network or read by the second UE from the serving network during a tune-away period of the second UE, the indication being received when the second UE fails to mitigate the interference; and
adjusting communications of the first UE to reduce the interference.

14. The method of claim 13 in which the adjusting comprises at least scheduling the first UE on an edge of a channel away from a channel used by the non-serving network, reducing a size of a bandwidth assignment of the first UE, capping a maximum transmission power of the first UE, or a combination thereof.

15. The method of claim 14 in which the adjusting is only performed on uplink subframes of the first UE that overlap with downlink subframes of the non-serving network when a TDD configuration of the non-serving network is known.

16. An apparatus configured for wireless communication, comprising:
means for receiving, at an eNodeB of a serving network, an indication that a first user equipment (UE) served by the eNodeB is causing interference with communications of a non-serving network, the interference being detected by a second UE of the non-serving network based at least in part on both downlink quality measured on a first set of subframes without interference and downlink quality measured on a second set of subframes with interference, the first set of subframes and the second set of subframes being determined based on a TDD configuration of the serving network that is received at the second UE from the non-serving network or read by the second UE from the serving network during a tune-away period of the second UE, the indication being received when the second UE fails to mitigate the interference; and
means for adjusting communications of the first UE to reduce the interference.

17. A computer-readable medium having non-transitory program code recorded thereon, the non-transitory program code comprising:
program code to receive, at an eNodeB of a serving network, an indication that a first user equipment (UE) served by the eNodeB is causing interference with communications of a non-serving network, the interference being detected by a second UE of the non-serving network based at least in part on both downlink quality measured on a first set of subframes without interference and downlink quality measured on a second set of subframes with interference, the first set of subframes and the second set of subframes being determined based on a TDD configuration of the serving network that is received at the second UE from the non-serving network or read by the second UE from the serving network during a tune-away period of the second UE, the indication being received when the second UE fails to mitigate the interference; and
program code to adjust communications of the first UE to reduce the interference.

18. An apparatus configured for wireless communication, the apparatus comprising:
a memory; and
at least one processor coupled to the memory, the at least one processor being configured:
to receive, at an eNodeB of a serving network, an indication that a first user equipment (UE) served by the eNodeB is causing interference with communications of a non-serving network, the interference being detected by a second UE of the non-serving network based at least in part on both downlink quality measured on a first set of subframes without interference and downlink quality measured on a second set of subframes with interference, the first set of subframes and the second set of subframes being determined based on a TDD configuration of the serving network that is received at the second UE from the non-serving network or read by the second UE from the serving network during a tune-away period of the second UE, the indication being received when the second UE fails to mitigate the interference; and
to adjust communications of the first UE to reduce the interference.

19. The apparatus of claim 18 in which the at least one processor is further configured to perform at least scheduling the first UE on an edge of a channel away from a channel used by the non-serving network, reducing a size of a bandwidth assignment of the first UE, capping a maximum transmission power of the first UE, or a combination thereof.

20. The apparatus of claim 19 in which the at least one processor is further configured to only adjust uplink subframes of the first UE that overlap with downlink subframes of the non-serving network when a TDD configuration of the non-serving network is known.

* * * * *